United States Patent
Schiff

(10) Patent No.: US 8,047,903 B1
(45) Date of Patent: Nov. 1, 2011

(54) EMERGENCY CABIN PRESSURIZATION SYSTEM AND METHOD FOR AN AIRCRAFT

(76) Inventor: Peter Schiff, Cookeville, TN (US)

( * ) Notice: Subject to any disclaimer, the term of this patent is extended or adjusted under 35 U.S.C. 154(b) by 171 days.

(21) Appl. No.: 11/598,268

(22) Filed: Nov. 13, 2006

Related U.S. Application Data

(63) Continuation-in-part of application No. 11/134,765, filed on May 23, 2005, now Pat. No. 7,305,842.

(51) Int. Cl.
*B64D 13/02* (2006.01)
(52) U.S. Cl. ......................................................... 454/71
(58) Field of Classification Search .................. 454/71, 454/74; 165/234
See application file for complete search history.

(56) References Cited

U.S. PATENT DOCUMENTS

| | | | |
|---|---|---|---|
| 3,537,510 A | 11/1970 | Rannenberg | 165/32 |
| 3,630,138 A * | 12/1971 | Marcussen et al. | 454/71 |
| 3,842,720 A * | 10/1974 | Herr | 454/71 |
| 4,443,156 A * | 4/1984 | Dunnam, Jr. | 417/12 |
| 5,160,244 A * | 11/1992 | Kuwabara et al. | 417/36 |
| 6,189,324 B1 * | 2/2001 | Williams et al. | 62/172 |
| 6,381,969 B1 * | 5/2002 | Afeiche et al. | 62/87 |
| 6,684,660 B1 * | 2/2004 | Bruno et al. | 62/402 |
| 6,695,578 B2 * | 2/2004 | Winslow et al. | 415/145 |
| 6,848,261 B2 * | 2/2005 | Claeys | 62/87 |

* cited by examiner

*Primary Examiner* — Steven B McAllister
*Assistant Examiner* — Samantha Miller
(74) *Attorney, Agent, or Firm* — LaMorte & Associates, P.C.

(57) ABSTRACT

An emergency pressurization system for an aircraft having an air pump that is powered by bleed air from an engine of the aircraft. Although the air pump is powered by engine bleed air, the air pump draws ambient fresh air from outside the aircraft, compresses the fresh air to a predetermined pressure and pumps compressed fresh air into the pressurized cabin of the aircraft without ever exposing the compressed fresh air to the engine air. The speed of the air pump is selectively controlled as a function of cabin pressure and/or bleed air pressure. In this manner, the cabin is maintained at a constant safe pressure.

8 Claims, 3 Drawing Sheets

EMERGENCY CABIN PRESSURIZATION SYSTEM AND METHOD FOR AN AIRCRAFT

RELATED APPLICATIONS

This application is a continuation-in-part of U.S. patent application Ser. No. 11/134,765, entitled Environmental Control System And Method For An Aircraft, filed May 23, 2005 now U.S. Pat. No. 7,305,842.

BACKGROUND OF THE INVENTION

1. Field of the Invention

In general, the present invention relates to emergency pressurization systems for aircraft that have pressurized cabins. The present invention also relates to aircraft systems that utilize secondary turbines to compress air, wherein the secondary turbines are driven by the bleed air from an aircraft engine.

2. Prior Art Description

Low flying, relatively slow aircraft do not require sophisticated environmental controls for inside the aircraft. The quality of the air within the aircraft can be adjusted simply by opening and closing vents or windows. However, many modern aircraft are designed to fly at high speeds and at high altitude. Such aircraft require pressurized cabins, where the pressure within the aircraft is artificially maintained. If an aircraft cabin is pressurized, fresh ambient air cannot simply be vented into the pressurized cabin. Rather, fresh air must be compressed to a pressure that matches that of the interior of the pressurized cabin, thereby enabling the fresh air to flow into the pressurized cabin.

Aircraft that are designed to fly at high altitudes typically have jet engines or turboprop engines. Pressurized air is created by such engines. By bleeding some air from the engine, a source of high temperature/high pressure air can be obtained. In early designs for aircraft environmental control systems, engine bleed air was directly used to feed air into a pressurized cabin. Such an environmental control system is exemplified by U.S. Pat. No. 3,537,510 to Rennenberg, entitled Pressure And Temperature Regulator For Aircraft Bleed Air System. However, engine bleed air is typically at a high pressure and at a high temperature. A sophisticated heat exchanger and pressure valve regulator configuration must therefore be used to condition the bleed air so it is at the correct temperature and pressure to be introduced into the cabin.

Aircraft are sophisticated machines. Like all machines, the components of an aircraft wear and are subject to eventual failure. Should a door seal, window seal, vent, or fuselage seam of an aircraft fail, the cabin of the aircraft may experience sudden decompression. If the aircraft is flying at high altitudes, there may not be enough oxygen in the ambient air to breathe. Furthermore, the sudden change in pressure can cause unconsciousness in less than sixty seconds.

In many aircraft, emergency oxygen is available in the event of cabin decompression. The oxygen enables the pilot to breathe so that the pilot can make an emergency descent to an altitude of below 12,500 feet. Once at such an altitude, ambient pressure and oxygen levels are sufficient to maintain consciousness. However, an aircraft may not have the ability to rapidly descend to such an altitude. If an aircraft is flying over mountains or a storm, such a decrease in altitude may not be possible. Furthermore, if the aircraft is flying over an ocean, the decrease in engine efficiencies created by the descent in altitude may cause the aircraft to lack the fuel needed to reach its destination.

In order to avoid these problems, some aircraft contain emergency pressurization systems. The emergency pressurization systems automatically pump pressurized air into the aircraft cabin. Hopefully, the emergency pressurization system can add air to the cabin faster than pressurized air is leaking from the cabin and the cabin pressure can be maintained.

In the prior art, emergency pressurization systems typically direct pressurized engine bleed air directly into the aircraft cabin. Engine bleed air is very hot. The engine bleed air also contains engine fumes, water vapor and other contaminants. Consequently, a pilot must still find a way to quickly descend to a safe altitude before the pilot and passengers are overcome by the heat and the contaminated air.

A need therefore exists for an improved emergency pressurization system for an aircraft that can supply pressurized air into the aircraft cabin without ever directing engine bleed air into the cabin. This need is met by the present invention as described and claimed below.

SUMMARY OF THE INVENTION

Aircraft have a primary cabin pressurization system for pressurizing the aircraft cabin. The present invention is a system and method for pressurizing the aircraft cabin should the primary pressurization system fail in flight.

The present invention system utilizes an air pump that contains a turbine and a compressor. The turbine directly powers the compressor. However, the turbine and the compressor are pneumatically separate from each other. The turbine receives only bleed air from an engine of the aircraft. The compressor receives only fresh air from a vent in the aircraft.

The pressure within the aircraft cabin is monitored. When the cabin pressure falls below a preselected minimum pressure, bleed air is directed to the air pump. The amount of bleed air directed to the air pump is proportional to the amount of pressurized air needed to bring the cabin pressure back above the preselected minimum pressure. The bleed air powers the turbine of the air pump. The turbine powers the compressor. The compressor pressurizes fresh air and introduces that air into the aircraft cabin. This pressurizes the aircraft cabin, bringing the aircraft pressure back to above the preselected minimum pressure.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention emergency pressurization system can be used on any aircraft that uses a jet engine or turboprop engine, the present invention system is best suited for use on small private planes having pressurized cabins that seat no more than twelve people. With such a sized aircraft, a single system can be used. The present invention emergency pressurization system can be used on larger aircraft, however, various components would have to be supplied in multiples to meet the size requirements of such aircraft. By way of example, the present invention emergency pressurization system is being shown applied to a smaller aircraft. In this manner, the simplest and best mode of the system can be illustrated and described. However, it will be understood that the embodiment is merely exemplary and should not be considered a limitation on the application of the system to other sized aircraft.

Figure 1:
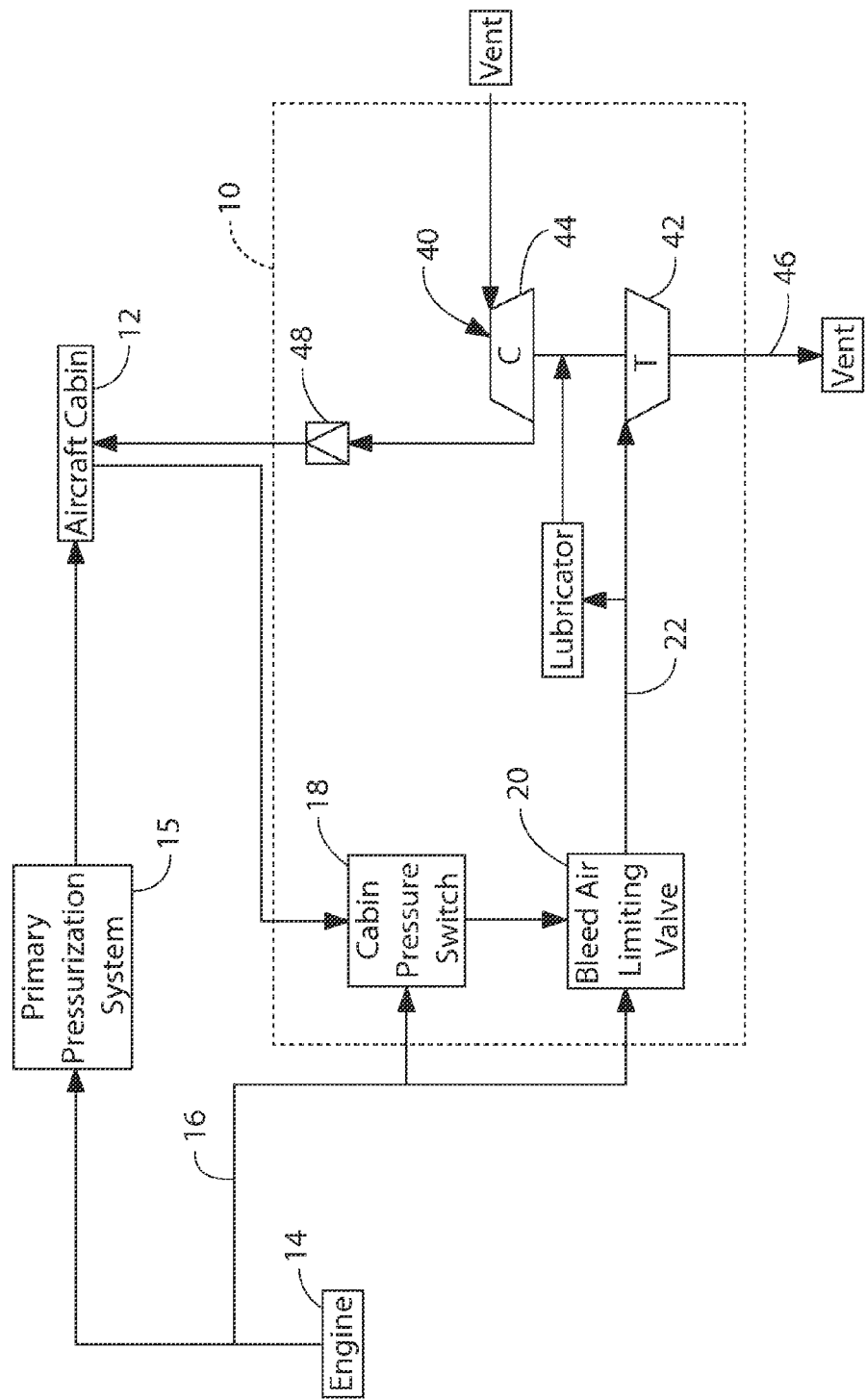
FIG. 1 is a schematic of an exemplary embodiment of the present invention environmental control system for an aircraft.

Referring to FIG. 1, there is a schematic of an exemplary embodiment of an emergency pressurization system 10 as applied to a private aircraft that has a pressurized cabin 12. The aircraft has at least one engine 14. The engine 14 can be either a jet engine or a turboprop engine, whereby the engine 14 has an internal compressor turbine that compresses incoming air. As the engine 14 compresses air, the air is increased in both temperature and pressure. A volume of the high temperature/high pressure air from within the engine 14 is bled away for use by a primary pressurization system 15. The emergency pressurization system 10 is used only if the primary pressurization system 15 fails or if the aircraft cabin 12 begins to leak pressurized air more quickly than can be supplied by the primary pressurization system 15. The emergency pressurization system 10 engages automatically and need not be activated by the pilot. As such, the emergency pressurization system 10 will activate even if the pilot becomes incapacitated by a sudden cabin pressure drop.

The automatic activation of the emergency pressurization system 10 is controlled by a cabin pressure switch 18. The cabin pressure switch 18 is a type of regulator that regulates the flow of engine bleed air as a function of cabin pressure. The cabin pressure switch 18 is coupled to the bleed line of the engine 14 by a lead 16. Normally, the flow of bleed air is blocked by the cabin pressure switch 18. However, should the cabin air pressure fall below a preset threshold, the cabin pressure switch 18 enables some of the bleed air to pass through the cabin pressure switch 18 and flow into a bleed air limiting valve 20. The preset threshold for the cabin pressure is preferably the ambient air pressure found at an altitude of 12,500 feet. The amount of bleed air allowed to flow through the cabin pressure switch 18 is preferably proportional to the degree by which cabin pressure has fallen below the preset threshold. Accordingly, if the cabin pressure is just a little low, a small volume of bleed air will pass through the cabin pressure switch 18 to the bleed air limiting valve 20. If the cabin pressure is very low, a large volume of bleed air will flow through the cabin pressure switch 18 into the bleed air limiting valve 20.

In addition to receiving bleed air from the cabin pressure switch 18, the bleed air limiting valve 20 is directly coupled to the engine 14 by lead 16. If a flow of bleed air is received from the cabin pressure switch 18, the bleed air limiting valve 20 opens proportionally, thereby enabling bleed air to flow directly from the engine 14 to an air pump assembly 40.

The structure of the air pump assembly 40 is described in co-pending patent application Ser. No. 11/134,765, entitled Environmental Control System And Method For An Aircraft, the disclosure of which is incorporated into this document by reference.

Figure 2:
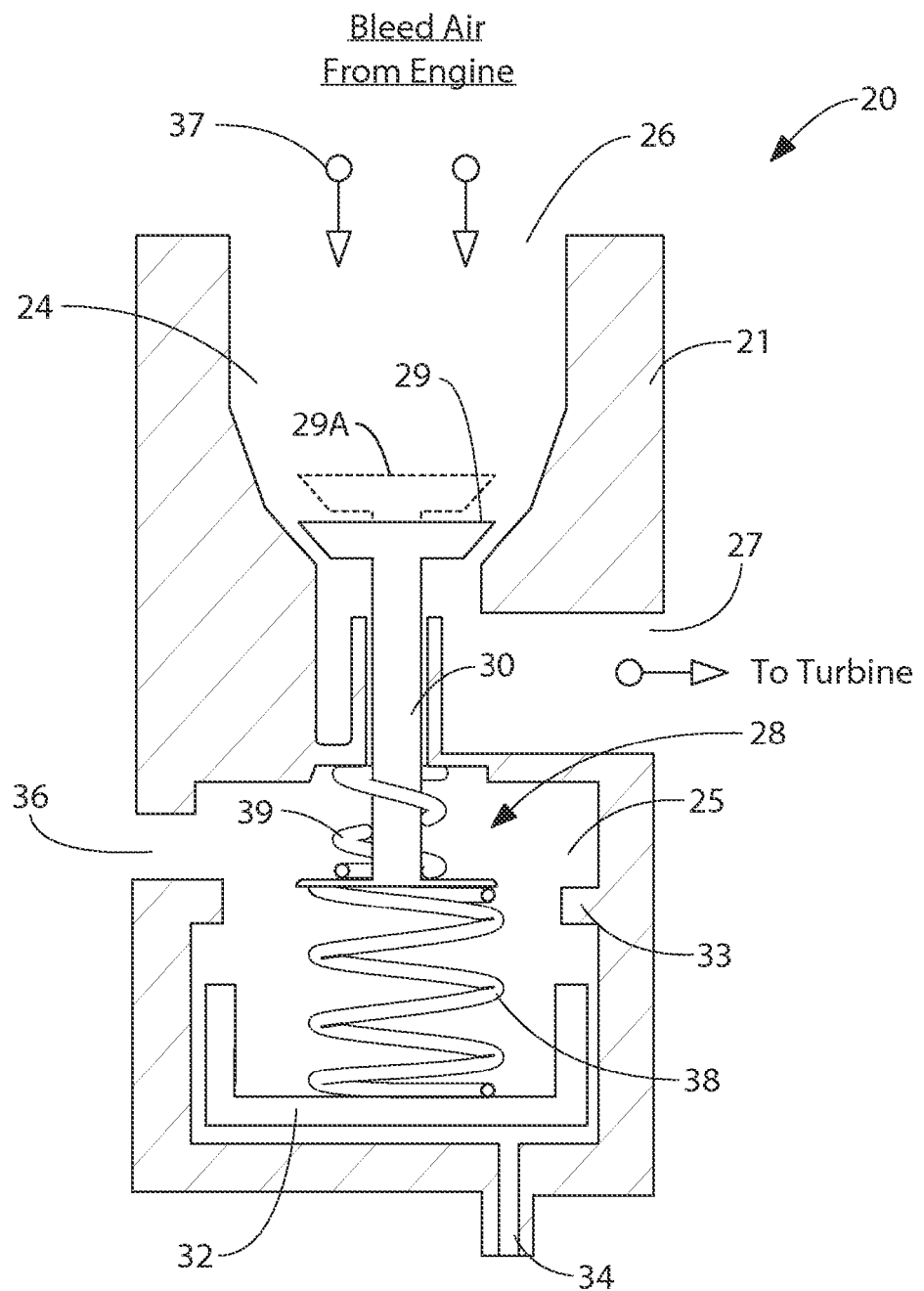
FIG. 2 is a cross-sectional view of an exemplary embodiment of a bleed air limiting valve.

Referring to FIG. 2, in conjunction with FIG. 1, the full structure and function of the bleed air limiting valve 20 is illustrated and described. The bleed air limiting valve 20 has a valve housing 21. The valve housing 21 defines an upper chamber 24 and a lower chamber 25. An input port 26 is disposed at the top of the upper chamber 24. The upper chamber input port 26 receives bleed air directly from the aircraft's engine 14, via the lead 16. The bleed air passes through the upper chamber 24 and exits through an output port 27. Bleed air passing through the upper chamber output port 27 is used to power an air pump assembly 40.

The flow of bleed air between the upper chamber input port 26 and the upper chamber output port 27 is regulated by a valve mechanism 28. The valve mechanism 28 includes a valve head 29 that is affixed to a valve stem 30. The valve head 29 is present in the upper chamber 24 of the valve housing 21. The valve head 29 moves up and down. When in a raised position, the valve head 29 is not sealed and bleed air is free to flow past the valve head 29 from the upper chamber input port 26 to the upper chamber output port 27. The raised position of the valve head is depicted by valve head 29a shown in hidden lines. However, when the valve head 29 is not in the raised position, the valve head 29 contacts and seals against the sides of the upper chamber 24. This fully prevents bleed air from reaching the upper chamber output port 27.

The raising and lowering of the valve head 29 is controlled by the elements in the lower chamber 25 of the valve housing 21. The valve head 29 is connected to a valve stem 30. The valve stem 30 extends from the upper chamber 24 to the lower chamber 25 of the valve housing 21. A piston head 32 is set in the lower chamber 25 of the valve housing 21. On one side of the piston head 32 is an input port 34. The lower chamber input port 34 receives bleed air from the cabin pressure control switch 18. As such, it will be understood that the lower chamber input port 34 will not receive bleed air unless the cabin pressure switch 18 detects that cabin pressure has fallen below a predetermined minimum pressure. Even then, the degree of bleed air received by the lower chamber input port 34 will be proportional to the degree by which the aircraft cabin is under-pressurized.

A vent port 36 is disposed in the lower chamber 25 on the opposite side of the piston head 32. It will therefore be understood that the piston head 32 will rise in the lower chamber 25 if the bleed air pressure coming through the lower chamber input port 34 surpasses ambient pressure.

A lower spring 38 joins the piston head 32 in the lower chamber 25 to the valve stem 30. An upper spring 39 joins the valve stem 30 to the valve housing 21. As the piston head 32 rises and falls, the movement is transferred to the valve stem 30 through the lower spring 38. The upper spring 39 has the singular function of making sure that the valve head 29 remains sealed against the valve housing 21 when the emergency pressurization system is not being utilized.

The lower spring 38 provides graduated upward pressure to the valve head 29, therein pressing the valve head 29 toward its raised position as the piston head 32 rises. If bleed air pressure is excessive, the piston head 32 may rise to its stop 33. This may cause the valve head 29 to open more than is necessary, especially at lower altitudes. The function of the lower spring 38 is to reduce the opening below the valve head 29 at lower altitudes. This is accomplished by the combination of the tension in the lower spring 38 and the bleed air pressure. The bleed air pressure decreases with the aircraft altitude as the density of ambient air decreases. Accordingly, the pressure of the bleed air, shown in the direction of arrows 37, decreases as the ambient air pressure decreases at higher altitudes. By the action of the relatively constant pressure applied by the lower spring 38, the valve head 29 automatically opens to allow proportionally more bleed air flow to the air pump assembly 40 as the aircraft altitude increases. This uniquely allows more pressurization air flow into the cabin, as is needed at higher altitudes.

The piston head 32 rises when bleed air flows through the lower chamber input port 34. Bleed air flows through the lower chamber input port 34 when cabin pressure falls below a threshold. As the piston head 32 rises, the valve head 29 in the upper chamber rises. As the valve head 29 rises, bleed air flows to the air pump assembly 40. As will be explained, the air pump assembly 40 compresses fresh air and introduces that air into the passenger cabin 12, thereby increasing cabin pressure.

Referring now solely to FIG. 1, it can be seen that the air pump assembly 40 is comprised of a turbine 42 and a compressor 44. The energy from the hot, high pressure bleed air is used to turn the turbine 42. The spent bleed air that exits the turbine 42 is vented from the aircraft through an exhaust vent line 46. The bleed air is never directed into the pressurized cabin 12.

The compressor 44 receives ambient air from outside the aircraft. If the aircraft is in flight at a significant altitude, the pressure of the ambient air received by the compressor 44 is less than the pressure desired within the pressurized cabin 12. The compressor 44 compresses the ambient air to a pressure that matches, or slightly exceeds, a selected emergency pressure for the pressurized cabin 12. In this manner, fresh air can be introduced into the cabin 12 while maintaining the cabin 12 at a safe pressure.

Air from the compressor 44 passes through a one-way valve 48 before it enters the cabin 12. The one-way valve 48 prevents pressurized air from flowing back into the air pump assembly 40 when the emergency air pressurization system 10 is not in use.

It will therefore be understood that the air pump assembly 40 interacts with two distinct and separate flows of air. The engine bleed air is used to turn the turbine 42 and powers the air pump assembly 40. Fresh air is compressed by the air pump assembly 40 and is introduced into the pressurized cabin 12. In this manner, engine bleed air is never directly introduced into the pressurized cabin 12.

The air pump assembly 40 has a turbine 42 and a compressor 44 that rotate at high speeds. Proper lubrication is therefore essential. Because the air pump assembly 40 is part of the emergency air pressurization system, it can be assumed that it will only be used if there has been a malfunction in the aircraft. It is therefore preferred that the air pump assembly 40 and its lubricator 50 be able to operate without electrical power in case the malfunction in the aircraft is electrical in nature.

Figure 3:
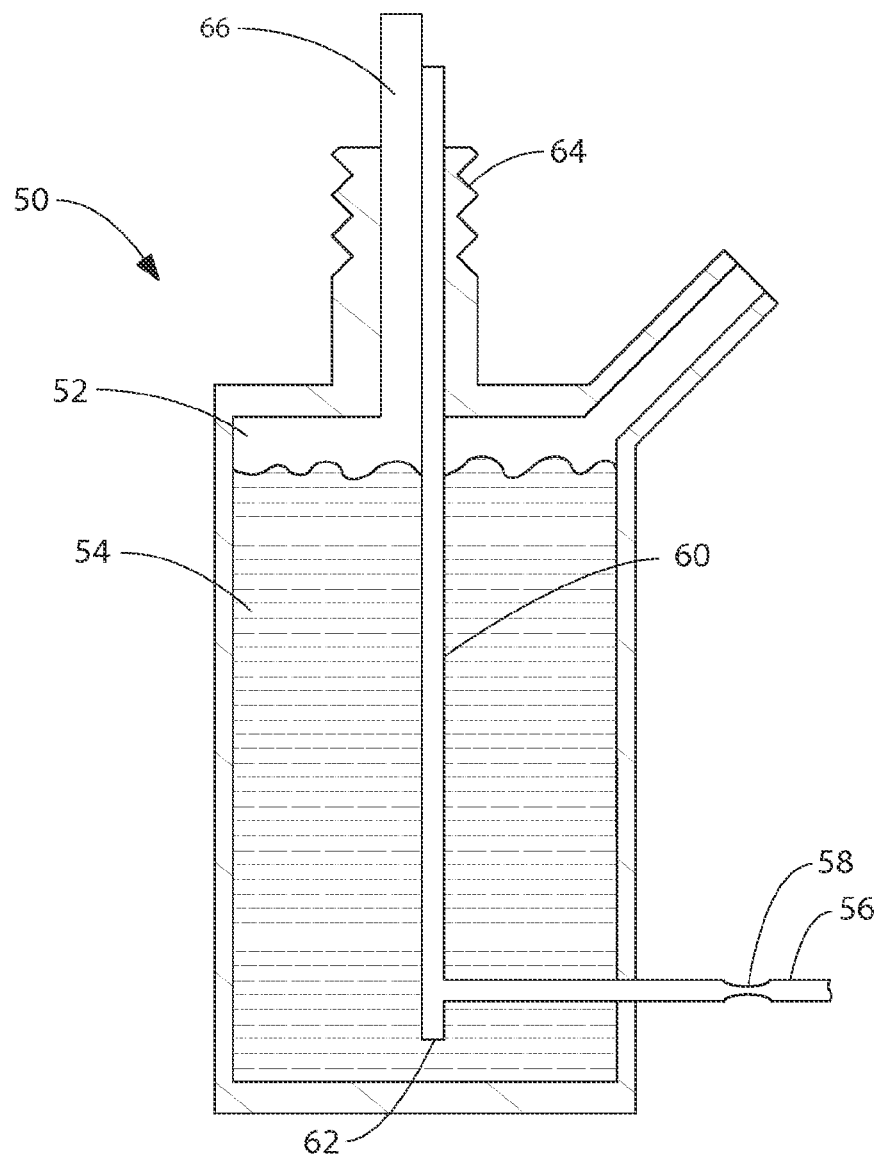
FIG. 3 is a cross-sectional view of an exemplary embodiment of a lubricator for an air pump assembly.

In FIG. 3, an exemplary embodiment of a lubricator 50 is shown. The lubricator 50 includes a storage reservoir 52 that is filled with a lubricant 54. The storage reservoir 52 is vented.

Referring to FIG. 3 in conjunction with FIG. 1 it can be seen that a bleed air inlet 56 passes into the storage reservoir 52. The bleed air inlet 56 contains a restrictor 58 so just a small flow of engine bleed air is able to flow into the storage reservoir 52. The bleed air inlet 56 intersects a vertical tube 60 that has an open bottom end 62. The intersection between the bleed air inlet 56 and the vertical tube 60 occurs above the open bottom end 62 of the vertical tube 60. As the bleed air flows into the vertical tube 60, it bubbles in the lubricant 54. Hydrostatic pressure causes the lubricant 54 in the vertical tube 60 to rise with the bubbles. The lubricant 54 flows into a supply lead 64 that connects to the air pump assembly 40.

A return tube 66 is also connected to the bearing housing of the air pump assembly 40. Once the lubricant 54 has filled the bearing housing of the air pump assembly 40 to a proper level, excess oil flows through the return tube 66 back into the storage reservoir 52. Lubrication is therefore supplied without electrical power.

Referring now back solely to FIG. 1, it will be understood that the present invention environmental control system 10 allows engine bleed air to power an air pump assembly 40. The air pump assembly 40 compresses fresh air and feeds that air into a pressurized aircraft cabin 12. The flow of compressed air into the cabin 12 is automatically regulated to maintain a safe pressure in the cabin 12. By using engine bleed air only to power the air pump assembly 40, the bleed air never enters the aircraft cabin 12 and cannot overheat and/or contaminate the air within the cabin 12. The present invention environmental control system therefore provides a safer way to pressurize an aircraft cabin in the case of an emergency. Furthermore, by nature of the heat of compression, the air pump assembly 40 provides moderately heated air to the aircraft cabin 12.

In addition, since the bleed air is heated and the ambient air is not heated, the engine bleed air contains more energy that the ambient air on a per volume basis. Accordingly, the air pump 40 will generally pump a greater volume of ambient air into the aircraft cabin 12 than the volume of bleed air used to power the pumping. As a result, the emergency pressurization system results in a more energy efficient method of pressurization as compared to prior art systems that introduce bleed air directly into the aircraft cabin.

It will be understood that the embodiment of the present invention that is described and illustrated is merely exemplary and that a person skilled in the art can make many variations to the shown embodiment using functionally equivalent components and configurations. All such alternate embodiments, modifications and variations are intended to be included within the scope of the present invention as defined by the claims.

What is claimed is:

1. In an aircraft having a cabin with an internal pressure and an engine that produces compressed engine air, an emergency pressurization system for pressurizing the aircraft should said internal pressure fall below a threshold pressure, said system comprising:

a regulator that receives said compressed engine air from said engine, said regulator passing a first output flow of compressed air only if said internal pressure fall below said threshold pressure, wherein said first output flow has a flow rate proportional to a pressure difference between said internal pressure and said threshold pressure;

a limiting valve controlled by said first output flow of said regulator, said limiting valve receiving said compressed engine air from said engine and passing a second output flow of compressed air, wherein said second output flow is governed by said first output flow received from said regulator; and an air pump powered by said second output flow, wherein said air pump draws ambient fresh air from outside the aircraft, compresses the fresh air to a predetermined pressure and pumps compressed fresh air into the cabin of the aircraft, therein raising said internal pressure without contaminating the fresh air with the compressed engine air.

2. The system according to claim 1, wherein said air pump has a turbine that is powered by said second output flow and an air compressor that is powered by said turbine.

3. The system according to claim 1, wherein second output flow is vented outside of said aircraft after being used to power said turbine.

4. The system according to claim 1, further including a lubricator that supplies a flow of lubricant to said air pump, wherein said lubricator is powered by said second output flow.

5. The system according to claim 1, further including a one-way valve between said air pump and said pressurized cabin that enables air to flow only from said air pump into said pressurized cabin.

6. A method of pressurizing an aircraft cabin should cabin pressure fall below a threshold pressure, said method comprising the steps of:
- tapping bleed air from an aircraft engine;
- providing a regulator that receives said bleed air, wherein said regulator passes a first output flow of compressed air at a flow rate proportional to a pressure difference between said cabin pressure and said threshold pressure;
- providing a limiting valve that is controlled by said first output flow of said regulator, wherein said limiting valve receives said bleed air and passes a second output flow of compressed air, wherein said second output flow is governed by said first output flow received from said regulator;
- providing an air pump having a turbine and a compressor that is powered by said turbine;
- powering said turbine with said second output flow;
- supplying fresh air to said compressor, wherein said compressor compresses the fresh air and provides compressed fresh air that is not contaminated with said bleed air; and
- introducing said compressed fresh air into said aircraft cabin, thereby pressurizing said aircraft cabin.

7. The method according to claim 6, further including the step of providing a lubricator that lubricates said turbine and said compressor, wherein said lubricator is powered by said second output flow.

8. In an aircraft having a primary cabin pressurization system for maintaining a cabin pressure within an aircraft cabin, a method of pressurizing said aircraft cabin should said primary cabin pressurization system fail and said cabin pressure fall below a threshold pressure, said method comprising the steps of:
- providing an air pump having a turbine and a compressor that is powered by said turbine;
- monitoring air pressure within said cabin;
- tapping bleed air from an engine;
- regulating said bleed air in proportion to a pressure differential existing between said threshold pressure and said cabin pressure to produce a regulated air output;
- directing regulated air output to said turbine wherein said regulated air output powers said turbine;
- supplying fresh air to said compressor, wherein said compressor provides compressed fresh air that is not contaminated with said bleed air; and
- introducing said compressed fresh air into said aircraft cabin, thereby pressurizing said aircraft cabin.

* * * * *